Johnson & Howarth,
Fish Hook.
N°. 54,251.  Patented Apr. 24, 1866.
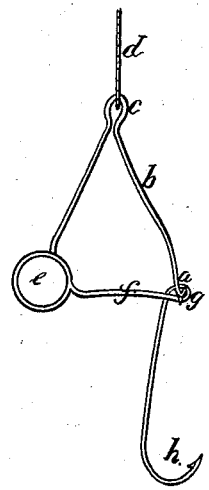
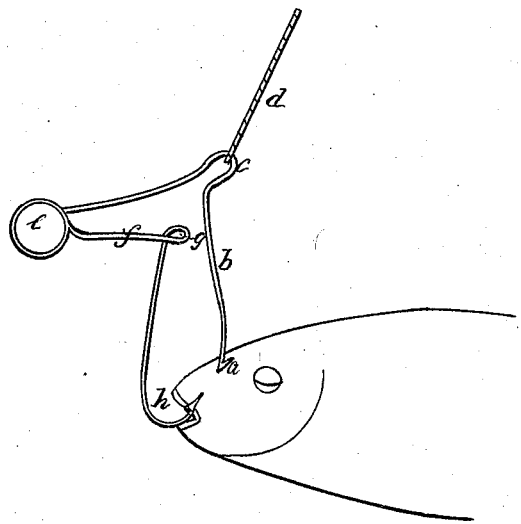
Witnesses.  Inventor.
Geo. D. Walker  Job Johnson
Chas. H. Smith

UNITED STATES PATENT OFFICE.

JOB JOHNSON AND HEZEKIAH HOWARTH, OF BROOKLYN, NEW YORK, ASSIGNORS TO JOB JOHNSON.

IMPROVEMENT IN FISH-HOOKS.

Specification forming part of Letters Patent No. 54,251, dated April 24, 1866.

*To all whom it may concern:*

Be it known that we, JOB JOHNSON and HEZEKIAH HOWARTH, of Brooklyn, in the county of Kings and State of New York, have invented, made, and applied to use a certain new and useful Improvement in Fish Hooks or Traps; and we do hereby declare the following to be a full, clear, and exact description of the said invention, reference being had to the annexed drawings, making part of this specification, wherein—

Figure 1 is a side view of the hook as set for use, and Fig. 2 represents the same in position after the fish is caught.

Similar marks of reference denote the same parts.

Spring-hooks have heretofore been made with a lance or hook that is thrown down by the action of the spring to strike into the nose or gills of the fish, as may be seen in Letters Patent granted to Job Johnson, March 20, 1849.

The nature of our said invention consists in a spear, with or without barbs, connected with the line, in combination with a hook carrying the bait and with a spring and eye receiving the end of the barb or spear in such a manner that a pull of the fish upon the hook disconnects the spear and causes that and the hook to come toward each other, drawing the hook more firmly into the fish's or animal's mouth and causing the spear to stick into the fish or animal in the opposite direction.

In the drawings we have shown our hook as made of one piece of wire, the spear $a$ at the end of a spring-shank, $b$, with the eye $c$ for the line $d$; thence the wire passes to the spring-coil $e$, and from the coil the wire extends as an arm, $f$, to the eye $g$ and terminates as a hook, $h$.

It will be seen by the drawings that when the hook is set for use the end of the spear $a$ enters the eye $g$ slightly, and when the fish pulls upon the hook $h$ the inclined end of $a$ slides up out of the eye $g$ by the action of the spring-shank $b$ to throw the inclined end of the barb or spear $a$ forward and out of said eye $g$, almost equaling the action of the spring-coil $e$ to keep the end $a$ into said eye. Hence the slight pull of the fish separates $a$ and $g$, and the spear $a$ comes down upon the fish or animal at the same time that the spring $e$ throws the hook upward, thus securely holding the fish or animal between the hook and the spear.

The spear $a$ may be formed with two or more points, with or without barbs, connected to the shank $b$.

We do not limit ourselves to constructing this hook out of one piece of wire, as the parts may be made of separate pieces of metal.

What we claim, and desire to secure by Letters Patent, is—

The spear connected to the line, in combination with the spring and with the hook, substantially as specified, whereby the spring causes the hook and spear to come toward each other when the fish bites at the bait, as set forth.

In witness whereof we have hereunto set our signatures this 8th day of January, A. D. 1866.

JOB JOHNSON.
    HEZEKIAH HOWARTH.

Witnesses:
 LEMUEL W. SERRELL,
 CHAS. H. SMITH.